(12) United States Patent
Lee et al.

(10) Patent No.: US 12,032,469 B2
(45) Date of Patent: Jul. 9, 2024

(54) EXPLAINABLE ARTIFICIAL INTELLIGENCE MODELING AND SIMULATION SYSTEM AND METHOD

(71) Applicant: SK HOLDINGS CO., LTD., Seoul (KR)

(72) Inventors: Byung Min Lee, Cheonan-si (KR); Young Hee Kim, Seoul (KR); Jong Moon Kim, Cheonan-si (KR); Ki Peum Chun, Yongin-si (KR)

(73) Assignee: SK HOLDINGS CO., LTD., Seoul (KR)

( * ) Notice: Subject to any disclaimer, the term of this patent is extended or adjusted under 35 U.S.C. 154(b) by 597 days.

(21) Appl. No.: 17/420,237

(22) PCT Filed: Jan. 2, 2020

(86) PCT No.: PCT/KR2020/000022
§ 371 (c)(1),
(2) Date: Jul. 1, 2021

(87) PCT Pub. No.: WO2020/141882
PCT Pub. Date: Jul. 9, 2020

(65) Prior Publication Data
US 2022/0066905 A1   Mar. 3, 2022

(30) Foreign Application Priority Data

Jan. 4, 2019 (KR) .................. 10-2019-0000998

(51) Int. Cl.
*G06F 11/34* (2006.01)
*G06F 11/30* (2006.01)
*G06N 5/045* (2023.01)

(52) U.S. Cl.
CPC ........ *G06F 11/3457* (2013.01); *G06F 11/302* (2013.01); *G06F 11/3086* (2013.01); *G06N 5/045* (2013.01)

(58) Field of Classification Search
CPC .............. G06F 11/3457; G06F 11/302; G06F 11/3086; G06N 5/045
See application file for complete search history.

(56) References Cited

U.S. PATENT DOCUMENTS

2007/0094168 A1   4/2007  Ayala et al.
2010/0191541 A1*  7/2010  Prokoski ................ A61B 5/015
                                                           705/2

(Continued)

FOREIGN PATENT DOCUMENTS

EP            3 416 105 A1    12/2018
KR           10-1345068 B1    12/2013
KR        10-2018-0130925 A   12/2018

OTHER PUBLICATIONS

Yang K, Sun Z, Wang A, Liu R, Sun Q, Wang Y. Deep hashing network for material defect image classification. IET Computer Vision. Dec. 2018; 12(8):1112-20. (Year: 2018).*

(Continued)

*Primary Examiner* — Chuen-Meei Gan
(74) *Attorney, Agent, or Firm* — Sughrue Mion, PLLC

(57) ABSTRACT

Provided is a system and method that generates an artificial intelligence workflow model in which image conversion, measurement, and image searches can be performed, by selecting/combining algorithms suitable for a workflow having been created/modified according to a subject area such as a display manufacturing process, and that conducts a simulation of the generated model. An explainable artificial intelligence modelling and simulation method includes designing an artificial intelligence workflow model once algorithms suitable for a workflow having been created/

(Continued)

modified according to a subject area are selected from algorithms stored in advance; and conducting, when input information is input, a simulation of the artificial intelligence workflow model for the input information.

9 Claims, 16 Drawing Sheets

(56) References Cited

U.S. PATENT DOCUMENTS

2016/0358099 A1* 12/2016 Sturlaugson ........... G06N 5/043
2020/0012940 A1* 1/2020 Liu ...................... H04N 7/0135

OTHER PUBLICATIONS

International Search Report for PCT/KR2020/000022 dated Apr. 10, 2020 (PCT/ISA/210).
Extended European Search Report issued Aug. 19, 2022 in European Application No. 20736068.6.

* cited by examiner

FIG. 14

EXPLAINABLE ARTIFICIAL INTELLIGENCE MODELING AND SIMULATION SYSTEM AND METHOD

TECHNICAL FIELD

The present disclosure relates to explainable artificial intelligence (AI) technology, and more particularly, to a system and a method which generate an AI workflow model capable of image conversion, measurement, and image search, by selecting/assembling an algorithm suitable for a workflow created/edited according to a subject area of a semiconductor, display manufacturing process, and perform a simulation.

BACKGROUND ART

AI algorithms may be developed in a somewhat closed way, depending on individual ability, based on R languages, Python languages, and performance of AI algorithms may be evaluated and verified by individual criteria. Therefore, many AI algorithms should be continuously managed and controlled by people to maintain expected performance of AI and to stably operate, and thus there is a limit to unmanned intellectualization.

In addition, the related-art technology development process for AI algorithms may proceed in a somewhat personalized pattern, for example, in a method in which an analyzer designs, develops, and verifies in its individual development environment, and then, applies in order to satisfy unit requirements, and also, processes of understanding of performance and enhancement/distribution/discarding which change according to an environment may be manually performed, and therefore, there is a problem that it is not easy to enhance and share technology.

In addition, there is a growing trend toward algorithms of an open source-based deep learning technique and many algorithms are developing in recent years. However, in order to apply the algorithms to real world, it may be determined whether to distribute the algorithms by directly and continuously checking suitability of determination by AI.

However, there are many AI algorithms according to regions or requirements, and it may be difficult to check and verify AI algorithms one by one, which are periodically required to be remodeled by reflecting changing manufacturing data. To this end, many AI algorithms fail to be optimized. That is, faults of performance frequently occur due to failure of management of change in algorithms.

DISCLOSURE

Technical Problem

The present disclosure has been developed in order to address the above-discussed deficiencies of the prior art, and an object of the present disclosure is to provide an AI modeling and simulation system and method, which can visualize connection of algorithms based on a workflow and can automatically verify performance by an integrated simulation, and can perform centralized management for inter-comparison of performance by simulating a plurality of AI algorithms based on a workflow, simultaneously, can visualize connection of algorithms based on a workflow and can automatically verify performance by an integrated simulation, and can process results of classification and analysis to explain causes/grounds by images and standardized shape data.

Technical Solution

According to an embodiment of the present disclosure to achieve the above-described object, an explainable AI modeling and simulation method includes the steps of: when an algorithm suitable for a workflow created and edited according to a subject area is selected from pre-stored algorithms, designing an AI workflow model; and, when input information is inputted, performing a simulation for an AI workflow model with respect to the input information.

The AI workflow model may be provided by visualizing a workflow and an algorithm selected to suit the workflow.

The algorithms may be classified and stored in libraries of respective processes, such that the algorithms are assembled according to each process with respect to a data pre-processing process, a learning/classification process, a data post-processing process, and an iterative learning/classification process.

When image data is inputted, the AI workflow model may perform an image normalization process, a learning process, and an image feature analysis process in sequence, may extract image features by measuring an area of interest, and may generate explanation data based on the image features.

The step of performing the simulation may include a step of, when a plurality of deep learning AI workflow models or a plurality of machine learning AI workflow models are designed, registering a simulation for each AI workflow model; and a step of performing the registered respective simulations.

According to an embodiment of the present disclosure, the explainable AI modeling and simulation method may further include: a step of, when the respective simulations are performed, comparing and evaluating performance of the respective AI workflow models in real time, based on results of performing the respective simulations; and a step of continuously distributing or changing an optimal AI workflow model according to a result of comparing and evaluating in real time.

In addition, the step of performing the registered respective simulations may include performing the respective simulations simultaneously under the same condition, by using a distributed management environment which performs distributed management with respect to data related to each deep learning AI workflow model or machine learning AI workflow model.

The input information may be image data that is acquired in a processing process.

The step of comparing and evaluating may include selecting a first deep learning AI workflow model having the highest accuracy from among the plurality of deep learning AI workflow models which are simulated, and selecting a first machine learning AI workflow model having the same result calculated as the first deep learning AI workflow model, and the step of distributing or changing may include distributing or changing the selected first machine learning AI workflow model.

The step of performing the registered respective simulations may include: a step of, when image data is inputted, dividing the image data into analysis unit areas, determining whether there is a defect in each area, and determining a grade according to a result of determining; a step of extracting image features by measuring an area of interest which is determined as having a defect; a step of searching similar images of the image features; a step of estimating a fault-causing factor by analyzing commonality of the similar images; and a step of generating explanation data including the fault-causing factor.

The step of extracting the image features by measuring the area which is determined as having the defect may use any one algorithm of Find Defect, Validate Defect, GMM Classification, NCC Classification, Monitor Defect, and Extract Feature.

According to another embodiment of the present disclosure, an explainable AI modeling and simulation system may include: a storage unit configured to store algorithms; and a processor configured to, when an algorithm suitable for a workflow created/edited according to a subject area is selected from pre-stored algorithms, design an AI workflow model, and, when input information is inputted, perform a simulation for an AI workflow model with respect to the input information.

Advantageous Effects

According to embodiments of the present disclosure as described above, connection of algorithms can be visualized based on a workflow, and performance can be automatically verified by an integrated simulation, and a plurality of workflow-based AI algorithms can be simulated simultaneously and performance thereof can be compared.

In addition, according to various embodiments, results of classification and analysis can be made to explain causes/grounds with images and standardized data, and accordingly, a performance improvement direction can be suggested.

DESCRIPTION OF DRAWINGS

FIG. 14 is a view provided to explain a process of analyzing commonality of similar images, estimating a fault-causing factor, and generating explanation data in a process of performing a simulation for each AI workflow model;

BEST MODE

Hereinafter, the present disclosure will be described in detail with reference to the accompanying drawings.

1. Explainable AI Modeling and Simulation Method

Embodiments of the present disclosure provide a system and a method for providing an explainable AI simulation platform.

Herein, the 'explainable AI' refers to AI technology for extracting data which can explain causes/grounds as a result of classifying and analyzing by using AI.

Figure 1:
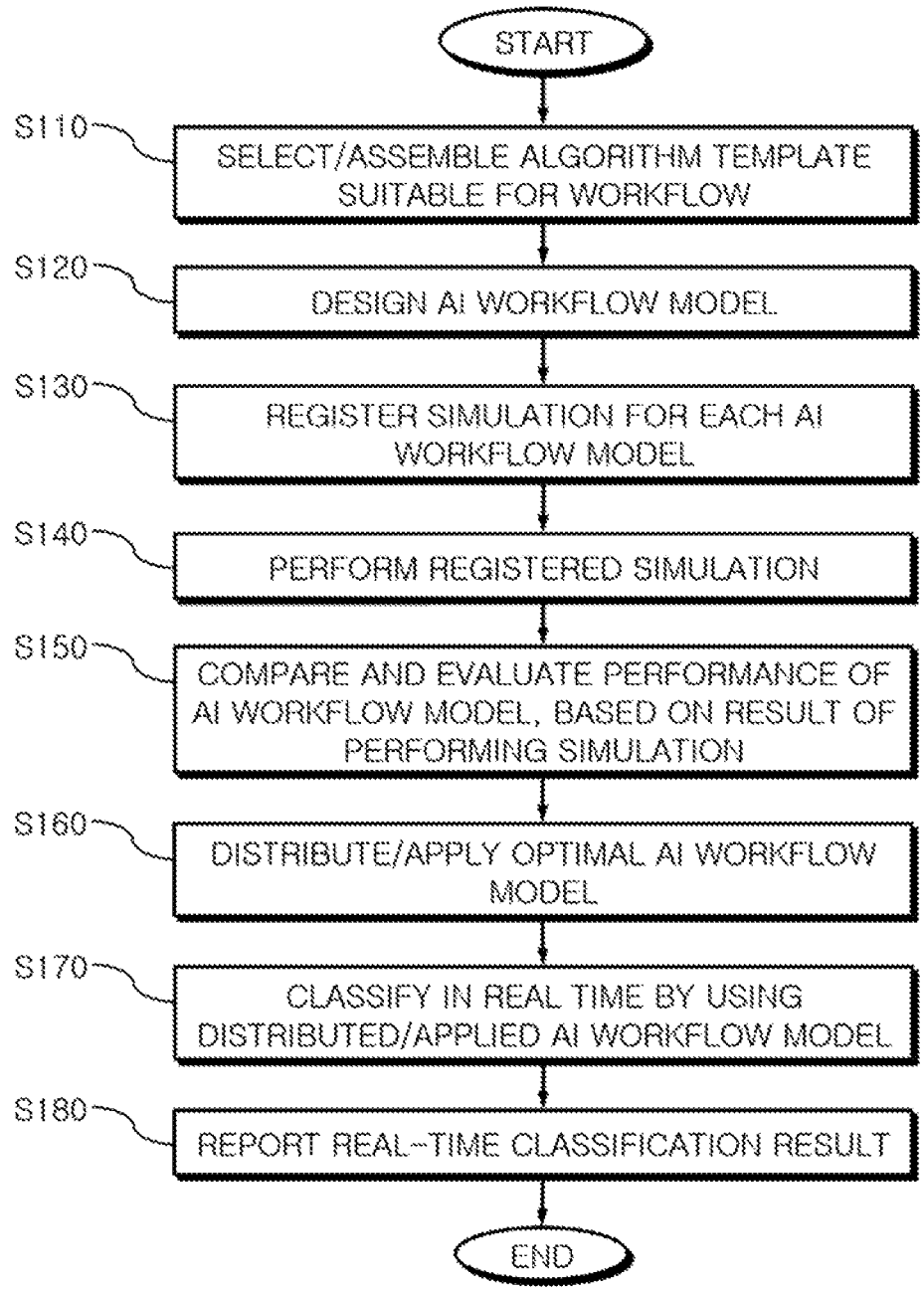
FIG. 1 is a flowchart provided to explain an explainable AI modeling and simulation method according to an embodiment of the present disclosure.

FIG. 1 is a flowchart provided to explain an explainable AI modeling and simulation method according to an embodiment of the present disclosure. In the explainable AI modeling and simulation method according to an embodiment of the present disclosure, when algorithms suitable for a workflow created/edited according to a subject area are selected from pre-stored algorithms, an AI modeling and simulation system may assemble the selected algorithms (S110) and may design an AI workflow model (S120).

In this case, the algorithms may be a plurality of deep learning algorithms or machine learning algorithms.

In addition, when a plurality of AI workflow models are designed, the AI modeling and simulation system may register a simulation for each AI workflow model (S130), and, when input information is inputted, may perform the registered respective simulations with respect to the input information (S140).

When the respective simulations are performed simultaneously under the same condition, the AI modeling and simulation system may continuously compare and evaluate performance of the designed respective AI workflow models, based on the results of performing the respective simulations (S150), and may continuously distribute or change an optimal AI workflow model according to the result of comparing and evaluating, and may apply the optimal AI workflow model to a processing process (S160).

In addition, the AI modeling and simulation system may classify results of performing the optimal AI workflow model distributed and applied to the processing process in real time (S170), and may perform a reporting operation for verifying and confirming the real-time classifying results (S180).

2. AI Workflow Model Designing

Figure 2:
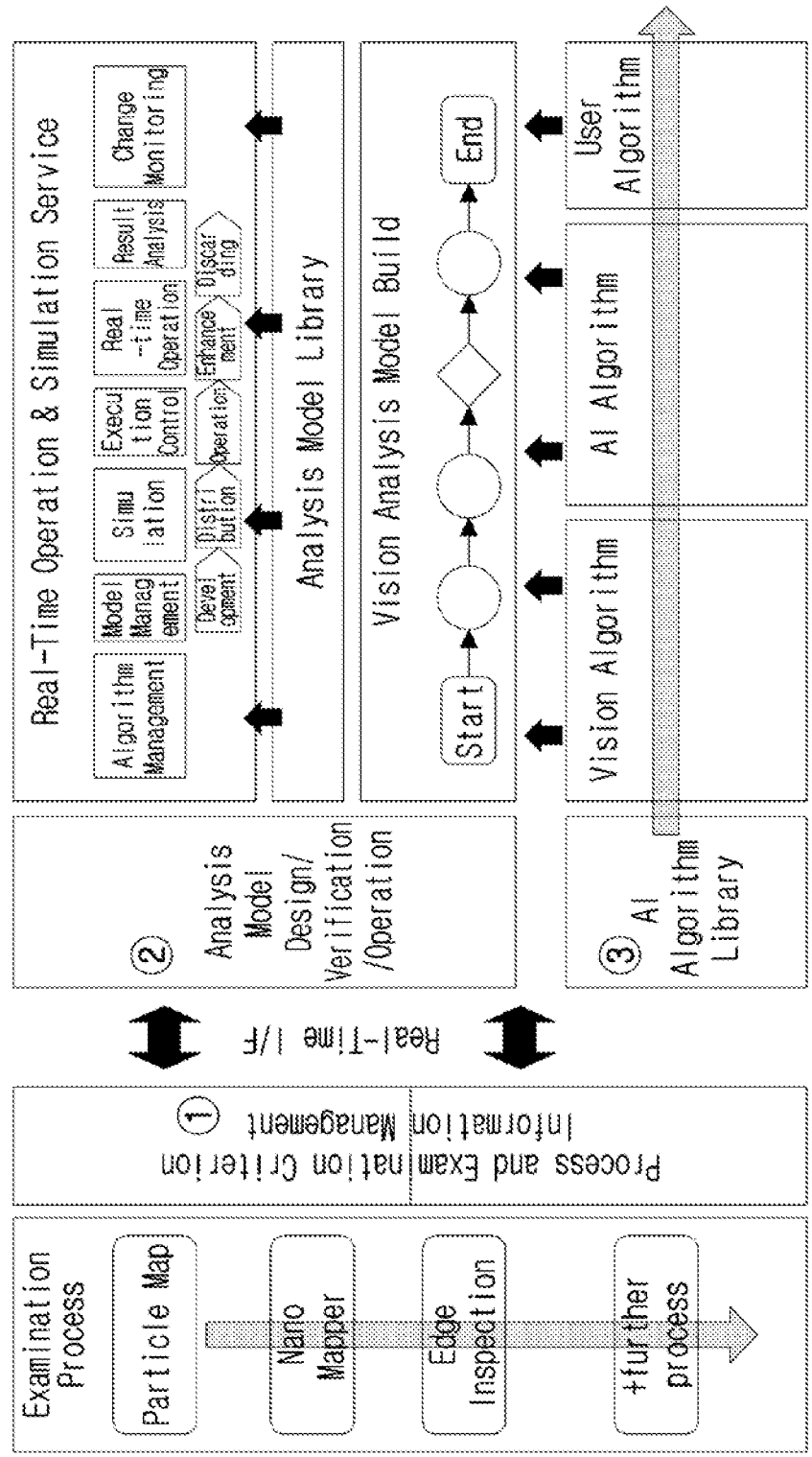
FIG. 2 is a view provided to explain a process of designing an AI workflow model.
Figure 3:
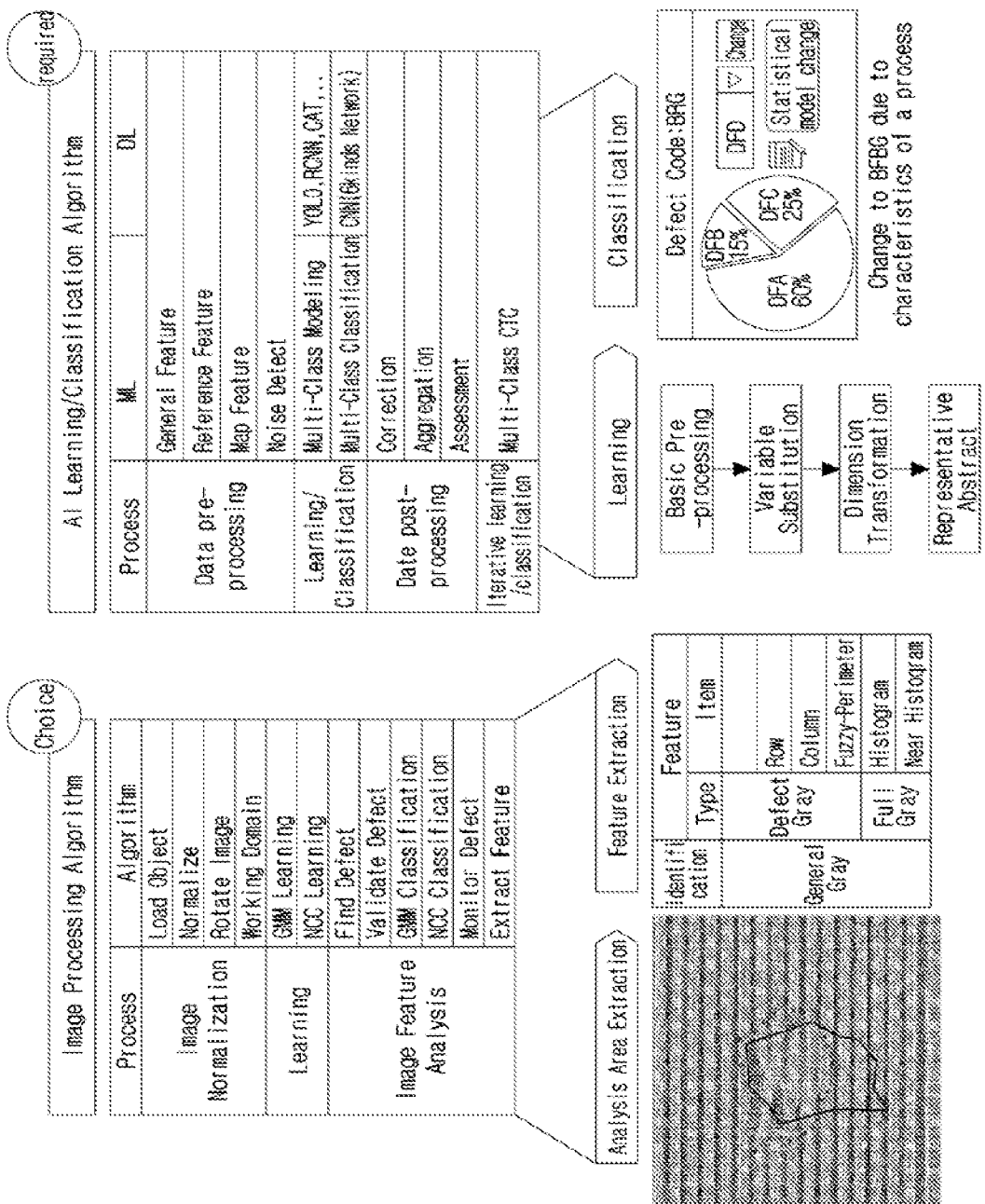
FIG. 3 is a view illustrating an algorithm.

FIG. 2 is a view provided to explain a process of designing an AI workflow model. The explainable AI modeling and simulation system according to an embodiment of the present disclosure relates to AI operation simulation platform technology for automating a development-verification-distribution-operation process of an AI algorithm for each process in the manufacturing industry, and for increasing operation efficiency, and may support main processes which are necessarily required to achieve various kinds of unmanned/automated manufacturing examination processes, which are referred to as interpretation and classification of the main object of Industry 4.0, Visual Information, such as learning classification algorithm modeling, algorithm asset management, parallel simulation performance and automatic algorithm performance verification, identifying of a result of performing a distributed algorithm as an image and shape data.

Furthermore, the explainable AI modeling and simulation system according to an embodiment of the present disclosure relates to technology for providing a development-operation-verification-distribution management system of an AI algorithm, which will continuously increase as AI-based manufacturing advancement is increasingly accelerated, and for explaining suitability of a developed AI algorithm with data. The present system can visualize connection of algorithms based on a workflow and can automatically verify performance by an integrated simulation, and can perform centralized management for intercomparison of performance by simulating a plurality of workflow-based deep learning algorithms and a plurality of machine learning algorithms simultaneously under the same condition, can implement explainable AI by selecting a deep learning algorithm having optimal accuracy, based on the result of simulating the deep learning algorithms and the machine learning algorithms simultaneously under the same condition, and by selecting/applying a machine learning algorithm having the same result value as the selected deep learning algorithm, can visualize connection of algorithms based on a workflow and automatically verify performance by an integrated simulation, and can process results of classification and analysis to explain causes/grounds by images and standardized shape data.

To perform these functions, the explainable AI modeling and simulation system according to an embodiment of the present disclosure may assemble selected algorithms when algorithms suitable for a workflow created/edited according to a subject area are selected from pre-stored algorithms, and may design an AI workflow model.

Herein, the pre-stored algorithms may include image processing algorithms and AI learning/classification algorithms, and the image processing algorithms and the AI learning/classification algorithms may be classified and stored in an arbitrarily edited library or a library for each process.

The image processing algorithms may include an algorithm for an image normalization process, an algorithm for a learning process, and an algorithm for an image feature analysis process, and a user may select algorithms suitable for a created/edited workflow from among the algorithm for the image normalization process, the algorithm for the learning process, and the algorithm for the image feature analysis process, and may assemble the algorithms.

As the algorithm for the image normalization process, any one algorithm of Load Object, Normalize, Rotate Image, and Working Domain may be selected.

As the algorithm for the learning process, any one algorithm of GMM Learning and NCC Learning may be selected.

As the algorithm for the image feature analysis, any one algorithm of Find Defect, Validate Defect, GMM Classification, NCC Classification, Monitor Defect, and Extract Feature may be selected.

The AI learning/classification algorithms may include an algorithm for a data pre-processing process, an algorithm for a learning/classification process, an algorithm for a data post-processing process, and an algorithm for an iterative learning/classification process.

As illustrated in FIGS. 4 to 7, the explainable AI modeling and simulation system according to an embodiment of the present disclosure may perform algorithm management, AI workflow model management, image data management, registration and performance of a simulation regarding an AI workflow model, distribution and application through a user interface outputted on a screen.

Figure 4:
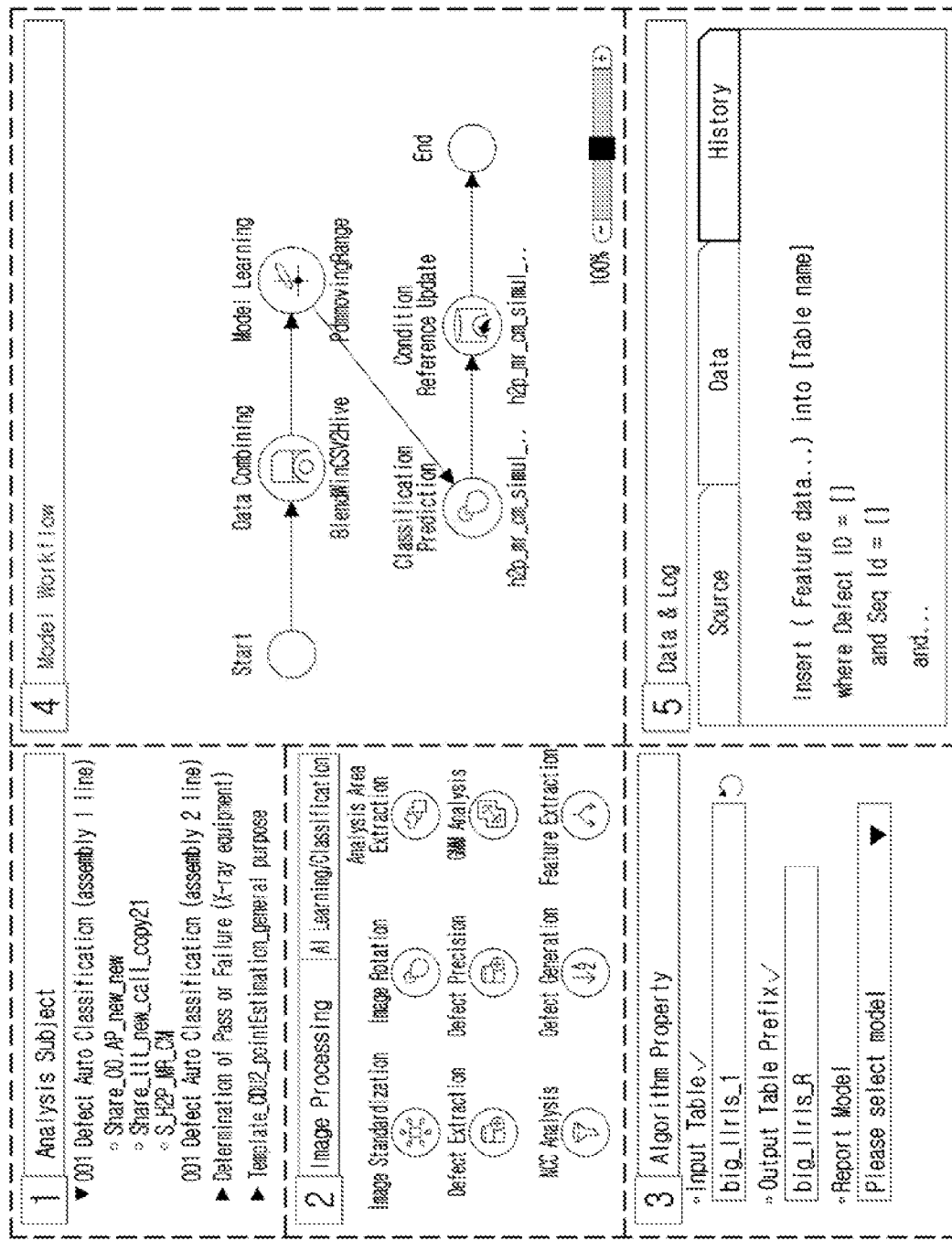
FIG. 4 is a view illustrating an AI workflow model.
Figure 5:
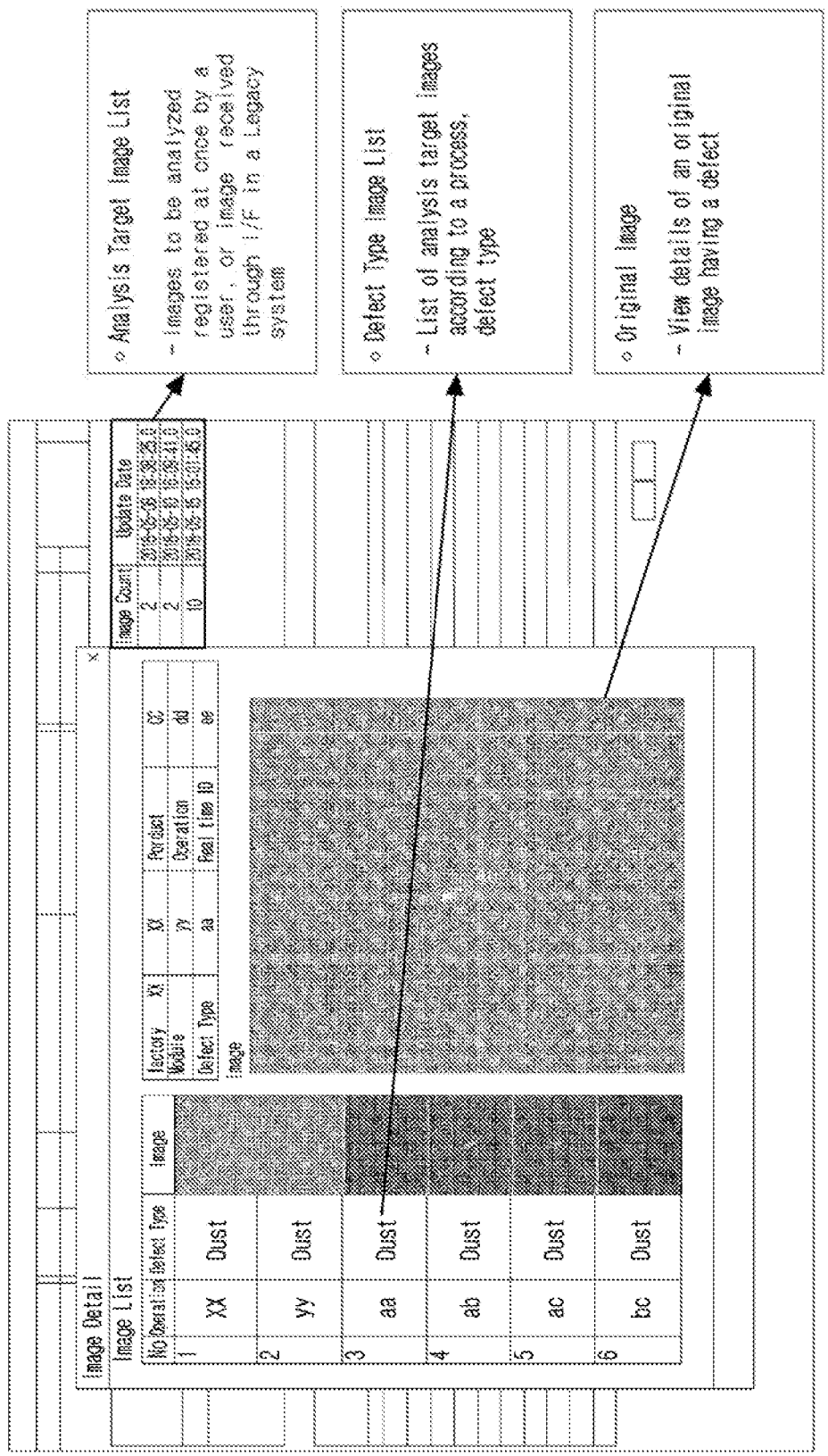
FIG. 5 is a view illustrating a screen for managing image data.
Figure 6:
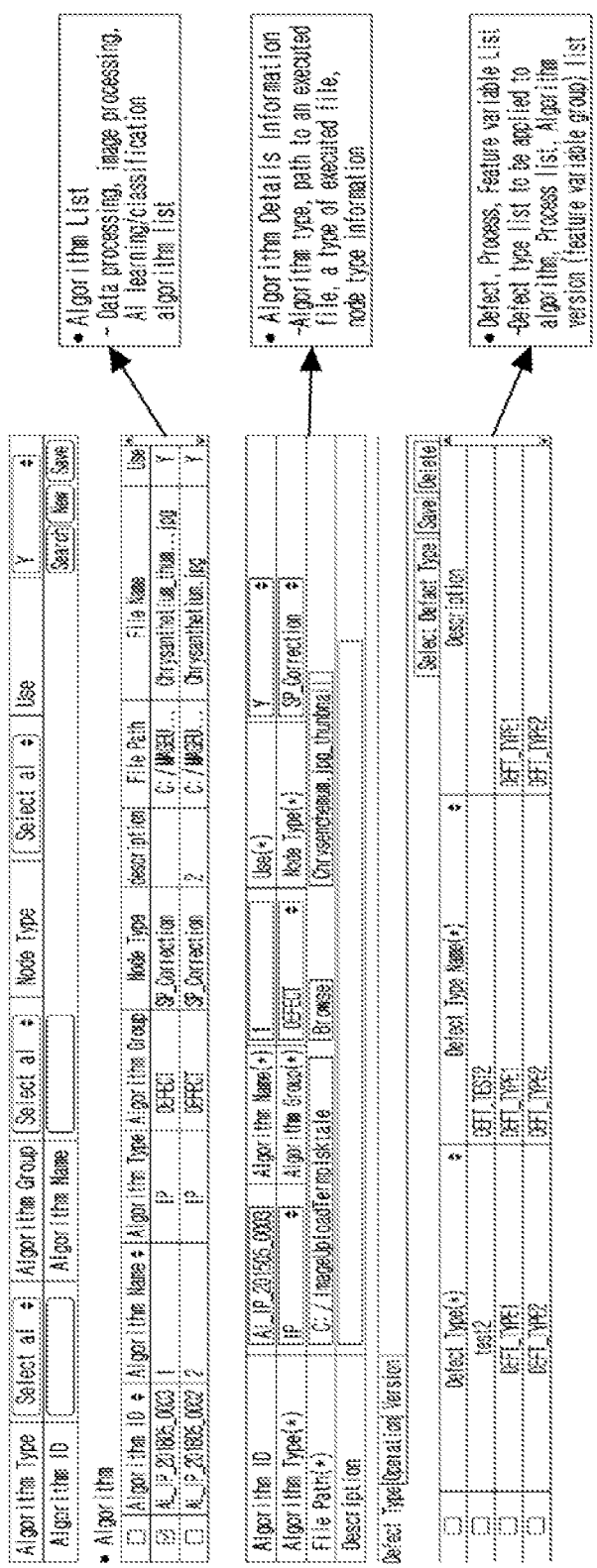
FIG. 6 is a view illustrating a screen for managing an algorithm.
Figure 7:
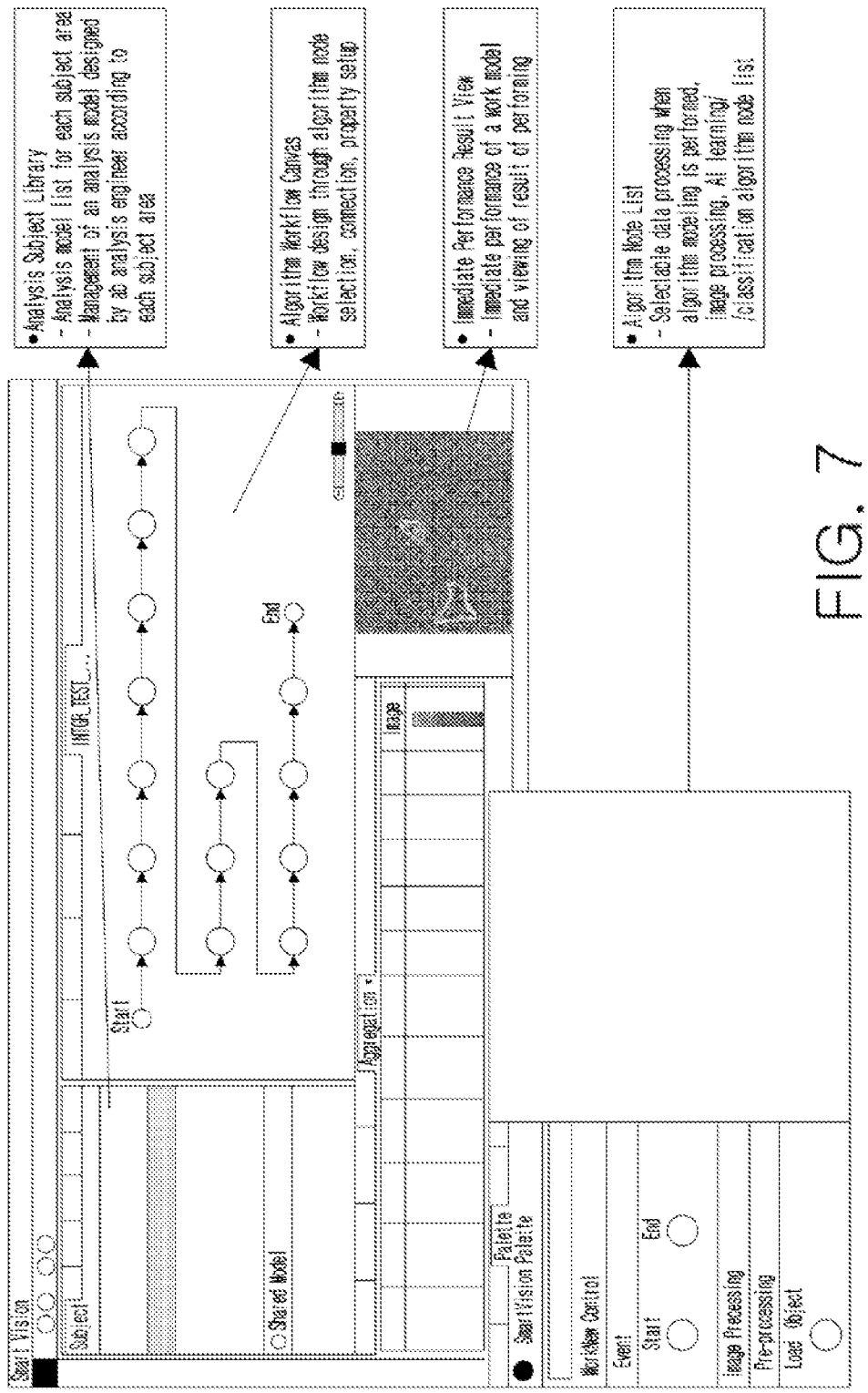
FIG. 7 is a view illustrating a screen providing a visualized AI workflow model.

Specifically, FIG. 4 is a view illustrating an AI workflow model, FIG. 5 is a view illustrating a screen for managing image data, and FIG. 6 is a view illustrating a screen for managing an algorithm. FIG. 7 is a view illustrating a screen providing a visualized AI workflow model.

The explainable AI modeling and simulation system may design an AI workflow model through a user interface as shown in FIG. 4.

In this case, the user interface for designing the AI workflow model may include an analysis subject area, an image processing and AI learning/classification area, an algorithm property, a model workflow area, and a data & log area.

The analysis subject area may be used to select a subject area in the form of a tree, to generate a library of a new AI workflow model, or to select a library of an AI workflow model stored, and the image processing and AI learning/classification area may be used to select/assemble an algorithm in a library in which algorithms are stored, and to design an AI workflow model through the user interface.

The algorithm property area may be used to select or set property information including an input and output parameter of an algorithm through a user interface, and the model workflow area may provide an AI workflow model by visualizing.

In addition, the data & log area may be used to identify a history, a log, data after an algorithm configurating an AI workflow model is executed.

In addition, as shown in FIG. 5, the user interface for managing image data, which is inputted to the designed AI workflow model, may include an analysis target image list area, a defect type image list area, and an original image area.

The analysis target image list area may be used to register or receive image data to be analyzed.

The defect type image list area displays a list of analysis target images according to each process or each defect type, and the original image area may display an original image from which image features are detected to allow a user to view the original image closely.

In addition, as shown in FIG. 6, the user interface for managing an algorithm may include an algorithm list area, an algorithm details area, and a defect, process, feature variable list area.

The algorithm list area may display data processing, image processing, and an AI learning/classification algorithm list, and the algorithm details information area may display an algorithm type, a path to an executed file, a type of an executed file, node type information.

The defect, process, feature variable list area may display a defect type list to be applied to the algorithm, a process list, and an algorithm version (feature variable group) list.

The user interface for providing a visualized AI workflow model may include an analysis subject library area, an algorithm workflow canvas area, an immediate performance result viewer area, and an algorithm node list area as shown in FIG. 7.

The analysis subject library area may display an analysis model list for each subject area, and may be used for a user to manage a designed analysis model according to a subject area.

The algorithm workflow canvas area may be used to design a workflow through algorithm node selection, connection, property setup.

The immediate performance result viewer area may be used to perform an AI workflow model and to identify a result of performing.

The algorithm node list area may display selectable data processing, image processing, AI learning/classification algorithm node list when algorithm modeling is performed.

3. Simulation

Figure 8:
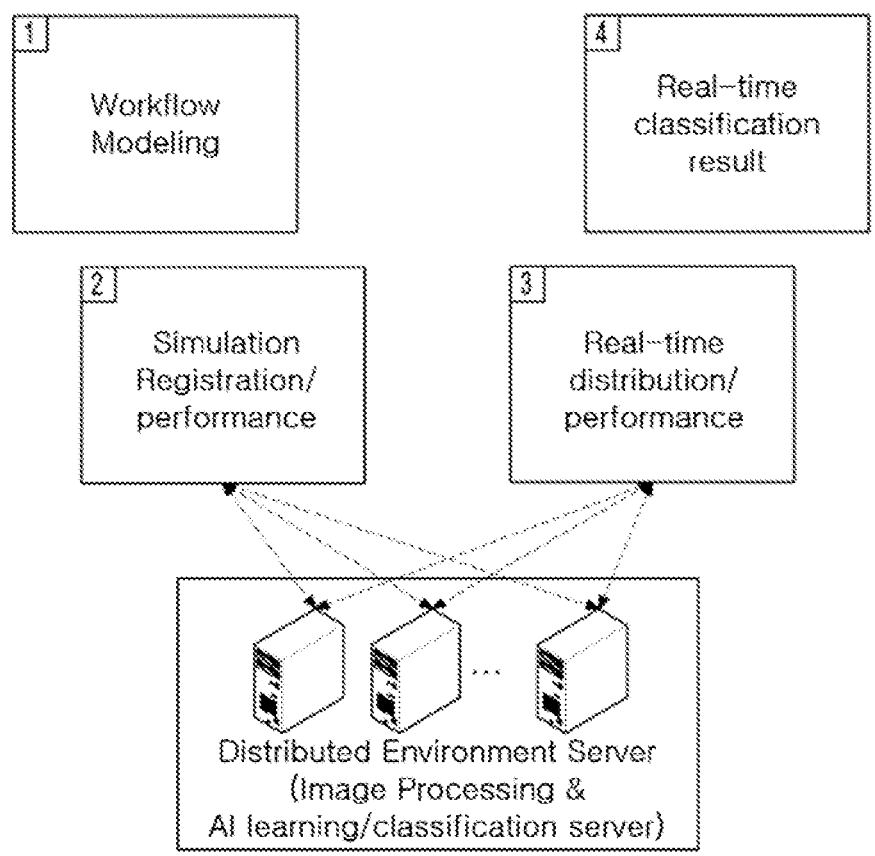
FIG. 8 is a view provided to explain a process of performing a simulation for each AI workflow model.

FIG. 8 is a view provided to explain a process of performing a simulation for each AI workflow model. In order to provide a development-operation-verification-distribution management system of an AI algorithm and to explain suitability of a developed AI algorithm with data, the explainable AI modeling and simulation system according to an embodiment of the present disclosure may select/assemble various algorithms, may design a plurality of deep learning AI workflow models or a plurality of machine learning AI workflow models, may register simulations regarding the plurality of deep learning AI workflow models or the plurality of machine learning AI workflow models when the plurality of deep learning AI workflow models or the plurality of machine learning AI workflow models are designed, and may perform the registered respective simulations.

Specifically, the explainable AI modeling and simulation system may perform respective simulations simultaneously under the same conditions, by using a distributed management environment for distributed management of data related to the plurality of deep learning AI workflow models or the plurality of machine learning AI workflow models.

Herein, the distributed management environment refers to an environment in which a plurality of servers connected in a chain form performs distributed management with respect to data related to their respective AI workflow models.

Figure 9:
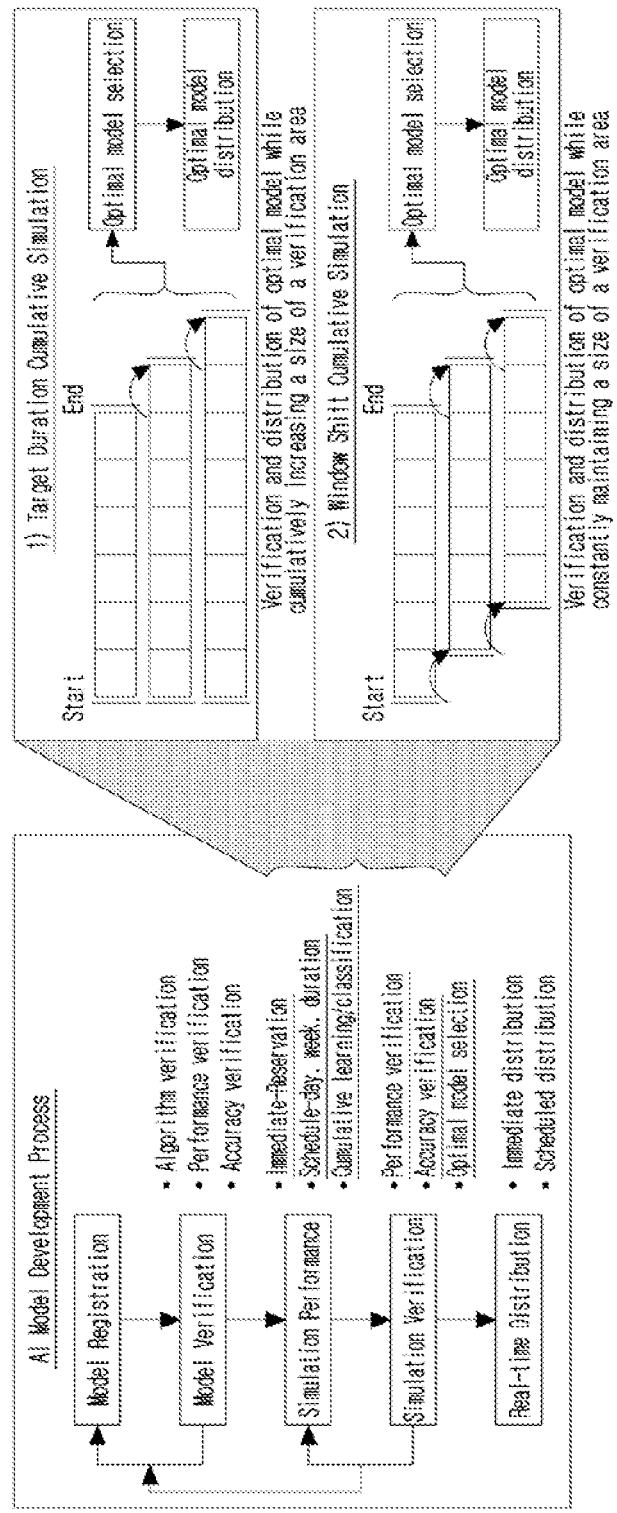
FIG. 9 is a view provided to explain a process of verifying an AI workflow model and a simulation.

FIG. 9 is a view provided to explain a process of verifying an AI workflow model and a simulation. The explainable AI modeling and simulation system according to an embodiment of the present disclosure may perform registered respective simulations by using a distributed management environment, may compare and evaluate performance based on the results of performing the respective simulations, may continuously distribute or change an optimal AI workflow model having verified performance, and may optimize the AI workflow model through cumulative and iterative learning verification regarding additional image/classification results, which are continuously generated during an operation.

For example, the explainable AI modeling and simulation system may compare and evaluate results of respective simulations performed simultaneously, while cumulatively increasing a size of a verification area, may select a first deep learning AI workflow model having the highest accuracy from among the plurality of deep learning AI workflow models, with reference to the results of evaluating, may select a first machine learning AI workflow model having the same result calculated as the first deep learning AI workflow model, and may distribute the first machine learning AI workflow model, or may compare and evaluate results of respective simulations performed simultaneously, while constantly maintaining a size of a verification area, may select a first deep learning AI workflow model having the highest accuracy from among the plurality of deep learning AI workflow models, with reference to the results of evaluating, may select a first machine learning AI workflow model having the same result calculated as the first deep learning workflow model, and may distribute the first machine learning AI workflow model.

Even when an optimal AI workflow model applied to a processing process is operated after being applied to the processing process, the explainable AI modeling and simulation system may continuously make additional images/classification results be cumulatively and iteratively learned verified, thereby continuously optimizing the AI workflow model.

Figure 10:
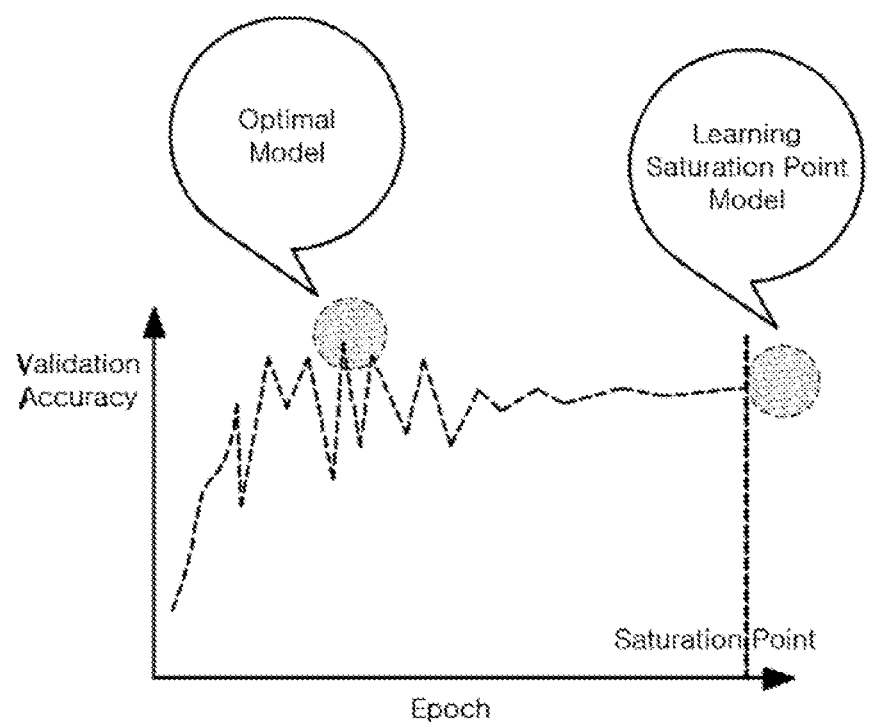
FIG. 10 is a view illustrating an optimal model of an AI workflow model.

FIG. 10 is a view illustrating an optimal model of an AI workflow model. When an AI workflow model is designed, the explainable AI modeling and simulation system according to an embodiment of the present disclosure may perform auto evaluation with respect to performance of the designed AI workflow model.

Specifically, the explainable AI modeling and simulation system may evaluate performance of the AI workflow model by selecting an optimal model having the highest accuracy of validity checking in a section within a saturation point through automated comparison of results of learning and classification.

Figure 11:
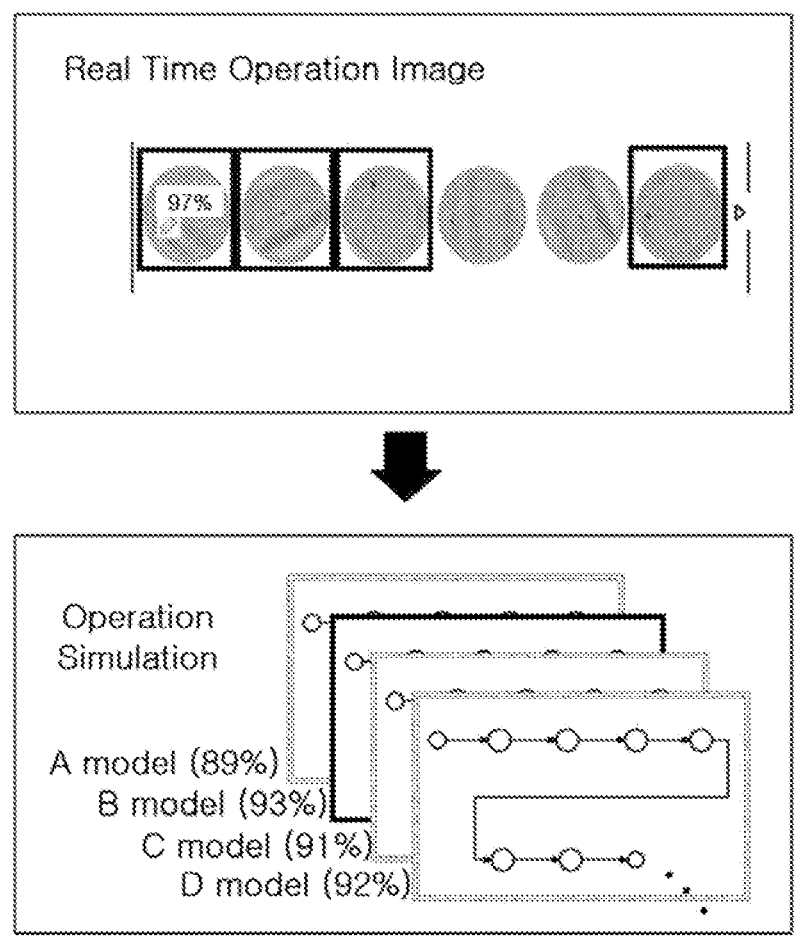
FIG. 11 is a view provided to explain a process of evaluating an optimal simulation between AI workflow models.

FIG. 11 is a view provided to explain a process of evaluating an optimal simulation between AI workflow models. As shown in FIG. 11, the explainable AI modeling and simulation system according to an embodiment of the present disclosure may perform simulations with respect to image data acquired in a processing process, by using respective AI workflow models, and may select an optimal AI workflow model by comparing the results of performing respective simulations for the AI workflow models. In this case, if the result as shown in FIG. 11 is calculated, a B model having the highest accuracy may be selected and distributed.

Figure 12:
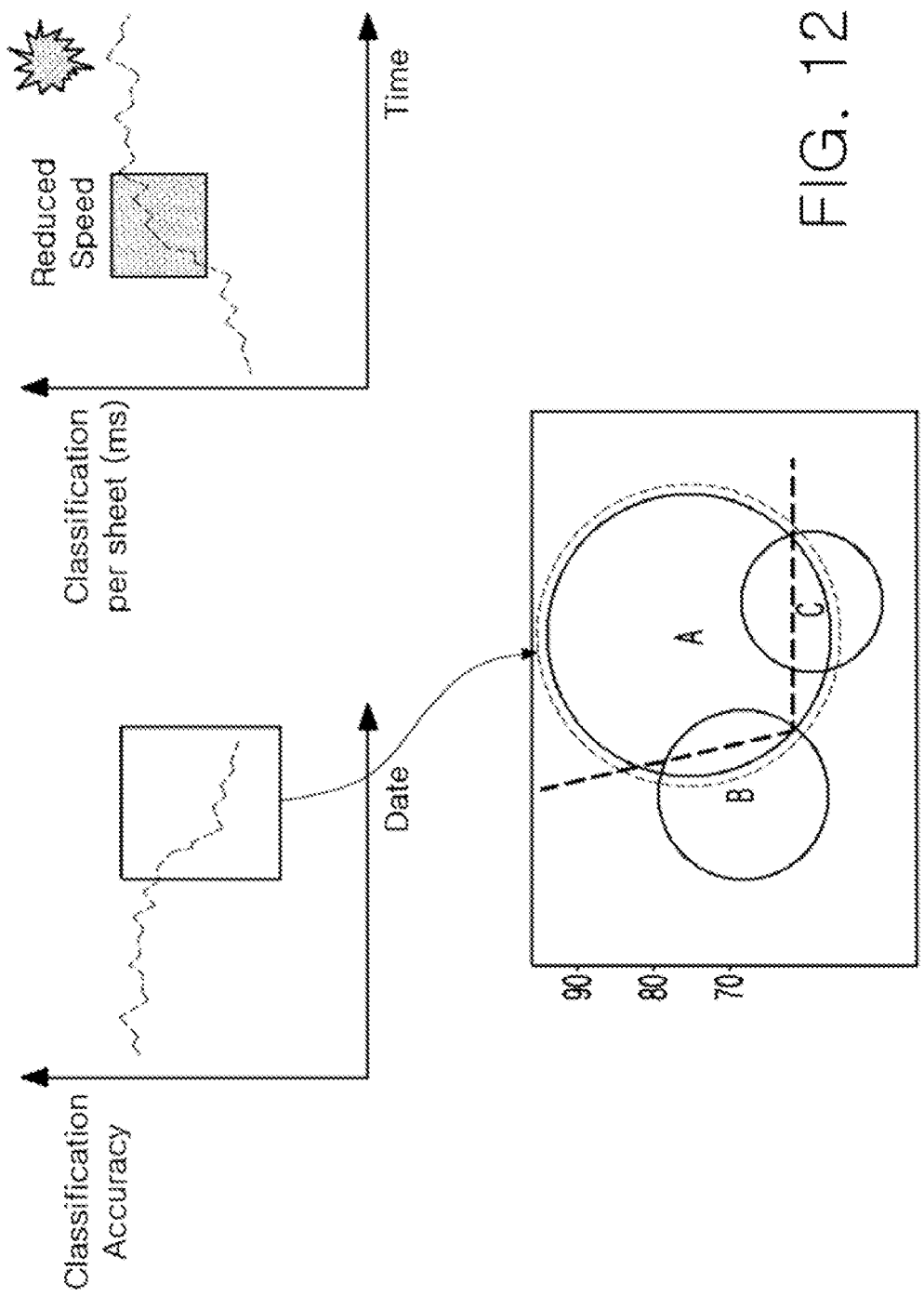
FIG. 12 is a view provided to explain a process of classifying AI workflow models and evaluating performance.

FIG. 12 is a view provided to explain a process of classifying AI workflow models and evaluating performance. The explainable AI modeling and simulation system according to an embodiment of the present disclosure may manage learning data/model by classifying AI workflow models and evaluating and monitoring performance.

Specifically, the explainable AI modeling and simulation system may analyze variability in purity and accuracy according to dates, types, and may suggest a key enhancement point needed to be enhanced.

Figure 13:
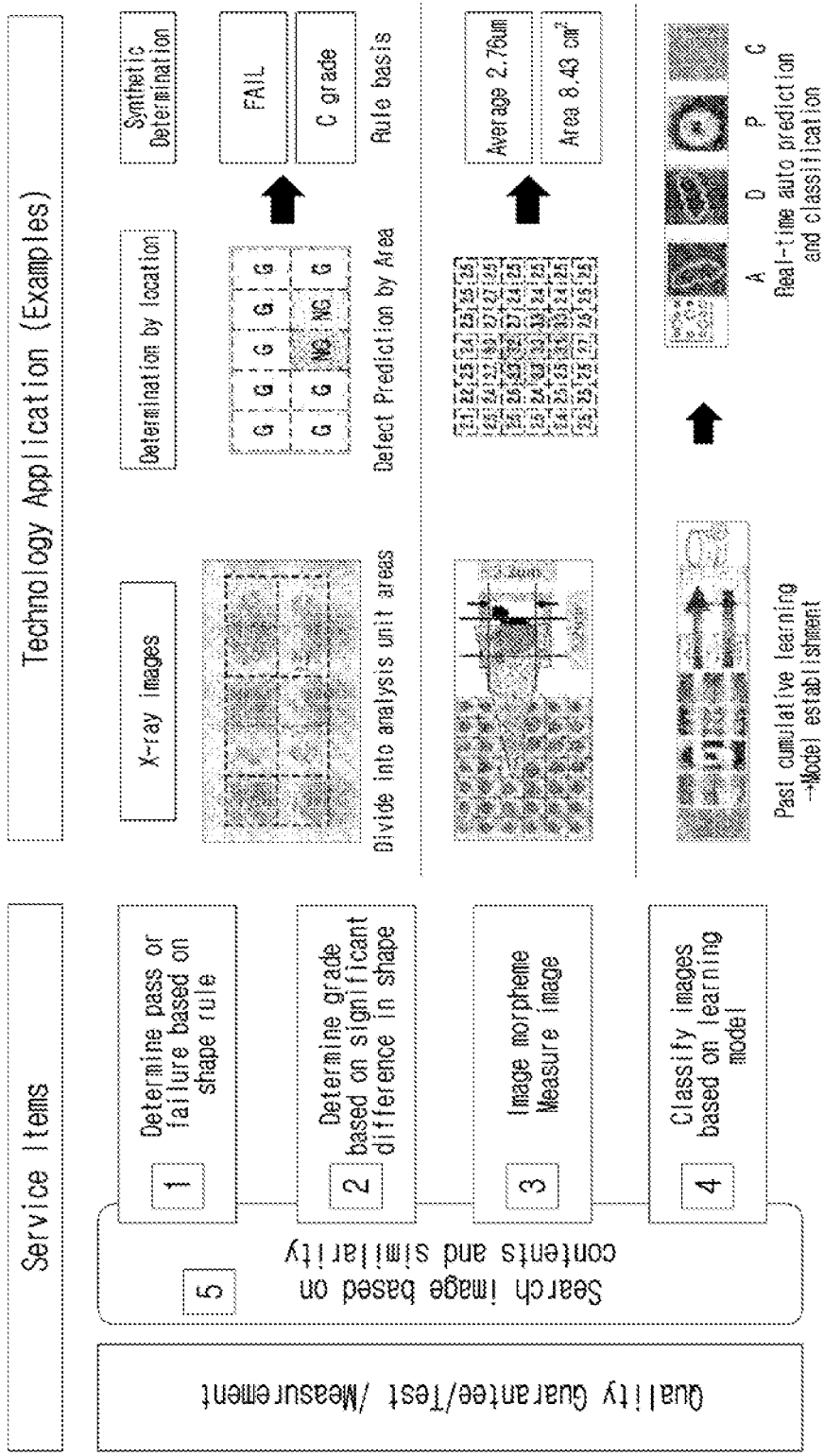
FIG. 13 is a view provided to explain a process of determining a grade by determining whether there is a defect in each region in a process of performing a simulation for each AI workflow model.

FIG. 13 is a view provided to explain a process of determining a grade by determining whether there is a defect in each area in a process of performing a simulation for each AI workflow model. The explainable AI modeling and simulation system according to an embodiment of the present disclosure may perform an image normalization process, a learning process, and an image feature analysis process in sequence when image data is inputted, and may extract image features by measuring an area of interest.

Specifically, when image data is inputted for quality guarantee, test, measurement in a processing process, the explainable AI modeling and simulation system may divide the image data into analysis unit areas, and may determine whether there is a defect in each area and may determine a grade according to the result of determining. In this case, the grade according to the result of determining may be a grade regarding a significant difference in shapes according to a predetermined condition.

In addition, when the grade is determined according to the result of determining, the explainable AI modeling and simulation system may extract image features by measuring the area of interest that is determined as having a defect.

Figure 14:
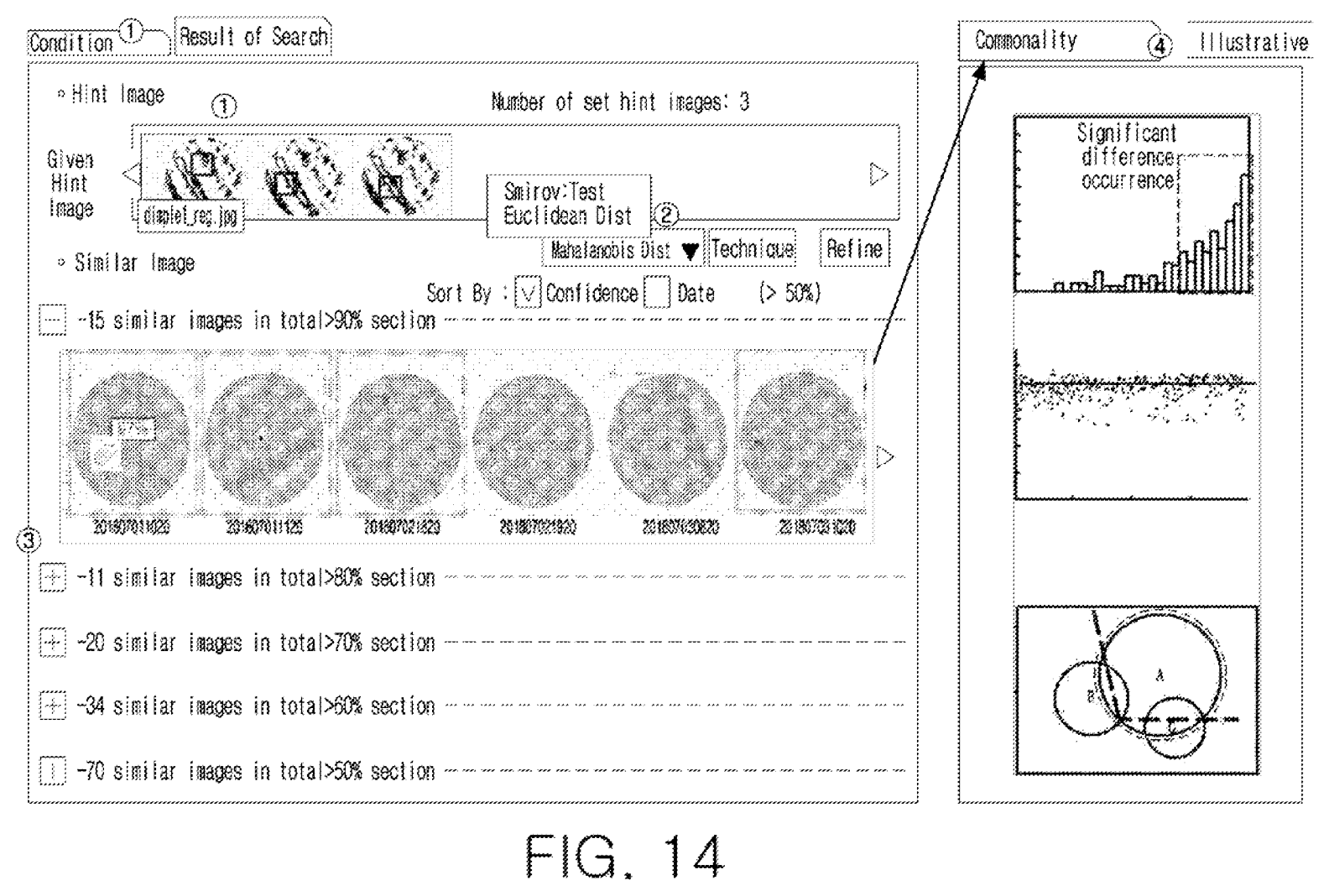

FIG. 14 is a view provided to explain a process of analyzing commonality of similar images in the process of performing a simulation for each AI workflow model, estimating a fault-causing factor, and generating explanation data.

The explainable AI modeling and simulation system according to the present embodiment may calculate information on sizes, areas, etc. of image features, which are extracted by measuring the area of interest determined as having a defect, may classify the images, may search similar images of the image features, and may analyze commonality of the similar images.

Figure 15:
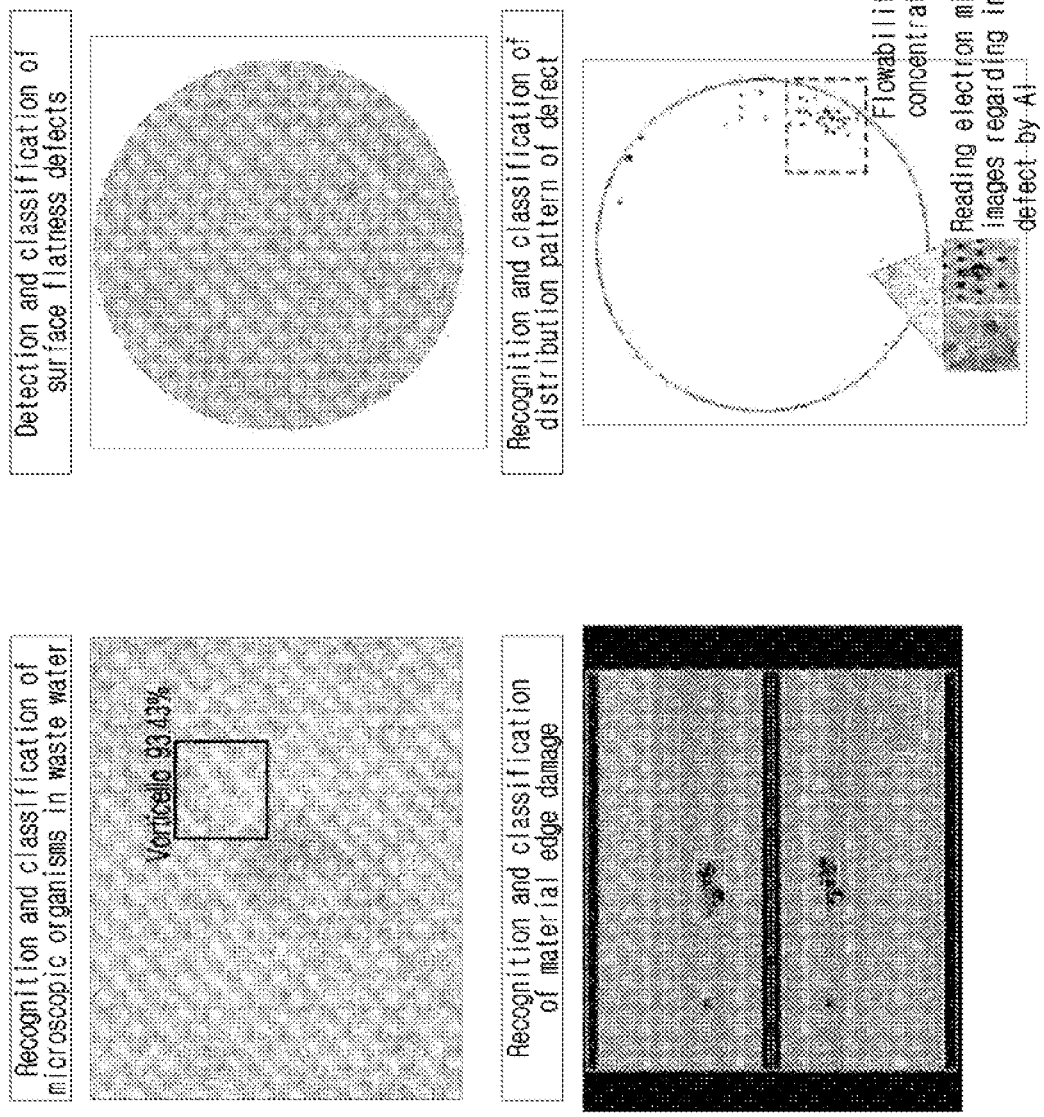
FIG. 15 is a view illustrating various image fault-causing factors.

In addition, the explainable AI modeling and simulation system may estimate a fault-causing factor according to the result of analyzing commonality of similar images as shown in FIG. 15, and may generate explanation data including the estimated fault-causing factor.

Herein, the explainable AI modeling and simulation system may search similar images of the image features in each predetermined similarity section, and may provide the searched similar images.

Through this, the explainable AI modeling and simulation system may estimate the fault-causing factor by using similar images that are searched in a section having the highest similarity, and, if it is difficult to estimate a fault-causing factor due a small sample, the system may analyze commonality of similar images by estimating a fault-causing factor by using similar images that are searched in a section which is lower than the highest-similarity section by one level.

As shown in FIG. 15, the explainable AI modeling and simulation system can estimate a fault-causing factor and may generate explanation data including the estimated fault-causing factor in various fields, such as the field of recognition and classification of microscopic organisms in waste water, the field of detection and classification of surface flatness defects, the field of recognition and classification of material edge damage, the field of detection of electron microscope images by using an AI algorithm, and recognition and classification of distribution patterns.

4. System Configuration

Figure 16:
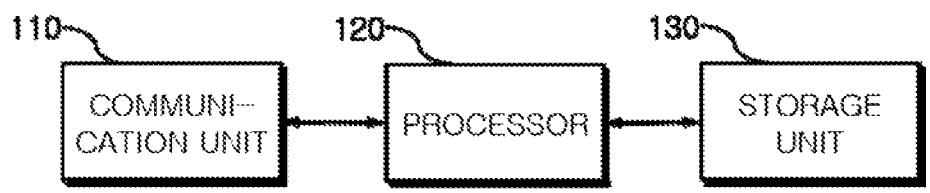
FIG. 16 is a block diagram of an explainable AI modeling and simulation system according to another embodiment of the present disclosure.

FIG. 16 is a block diagram of an explainable AI modeling and simulation system according to another embodiment of the present disclosure. The explainable AI modeling and simulation system according to an embodiment may include a communication unit 110, a processor 120, and a storage unit 130 as shown in FIG. 16.

The communication unit 110 is a means for connecting communication with a plurality of servers for a process facility management system or a distributed management environment, and may be used to receive image data acquired in the processing process or to distribute an AI workflow model having verified performance.

When an algorithm suitable for a workflow created/edited according to a subject area is selected from pre-stored algorithms, the processor 120 may design an AI workflow model, may register a simulation regarding the designed AI workflow model, and, when information is inputted, may perform registered simulations with respect to the inputted information, simultaneously, by using a distributed management environment.

In addition, the processor 120 may compare, evaluate, and verify performance based on the result of performing simulations, and may distribute a AI workflow model the performance of which is verified.

The storage unit 130 is a storage medium that stores programs and information necessary for operations of the processor 120. In addition, the storage unit 130 may classify and store image data, algorithms, AI workflow models, simulations in an arbitrarily edited library or a library for each process.

The technical concept of the present disclosure may be applied to a computer-readable recording medium which records a computer program for performing functions of the apparatus and the method according to the present embodiment. In addition, the technical concept according to various embodiments of the present disclosure may be implemented in the form of a computer-readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer-readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the an without departing from the scope of the present disclosure claimed in claims, and also, changed embodiments should not be understood as being separate from the technical concept or prospect of the present disclosure.

The invention claimed is:

1. An explainable artificial intelligence (AI) modeling and simulation method comprising the steps of:
when an algorithm suitable for a workflow created and edited according to a subject area is selected from pre-stored algorithms, designing an AI workflow model; and
when input information is inputted, performing a simulation for an AI workflow model with respect to the input information,
wherein the step of performing the simulation comprises:
a step of, when a plurality of deep learning AI workflow models or a plurality of machine learning AI workflow models are designed, registering a simulation for each AI workflow model; and
a step of performing the registered respective simulations, wherein the method further comprises:
a step of, when the respective simulations are performed, comparing and evaluating performance of the respective AI workflow models in real time based on results of performing the respective simulations; and
a step of continuously distributing or changing an optimal AI workflow model according to a result of comparing and evaluating in real time,
wherein the step of performing the registered respective simulations comprises:
a step of, when image data is inputted, dividing the image data into analysis unit areas, determining whether there is a defect in each area, and determining a grade according to a result of determining;
a step of extracting image features by measuring an area of interest which is determined as having a defect;
a step of searching similar images of the image features;
a step of estimating a fault-causing factor by analyzing commonality of the similar images; and
a step of generating explanation data including the fault-causing factor.

2. The method of claim 1, wherein the AI workflow model is provided by visualizing a workflow and an algorithm selected to suit the workflow.

3. The method of claim 1, wherein the algorithms are classified and stored in libraries of respective processes, such that the algorithms are assembled according to each process with respect to a data pre-processing process, a learning/classification process, a data post-processing process, and an iterative learning/classification process.

4. The method of claim 3, wherein, when image data is inputted, the AI workflow model is configured to perform an image normalization process, a learning process, and an image feature analysis process in sequence, to extract image features by measuring an area of interest, and to generate explanation data based on the image features.

5. The method of claim 1, wherein the step of performing the registered respective simulations comprises performing the respective simulations simultaneously under the same condition, by using a distributed management environment which performs distributed management with respect to data related to each deep learning AI workflow model or machine learning AI workflow model.

6. The method of claim 1, wherein the input information is image data that is acquired in a processing process.

7. The method of claim 1, wherein the step of comparing and evaluating comprises selecting a first deep learning AI workflow model having the highest accuracy from among the plurality of deep learning AI workflow models which are simulated, and selecting a first machine learning AI workflow model having the same result calculated as the first deep learning AI workflow model, and
wherein the step of distributing or changing comprises distributing or changing the selected first machine learning AI workflow model.

8. The method of claim 1, wherein the step of extracting the image features by measuring the area which is determined as having the defect uses any one algorithm of Find Defect, Validate Defect, Gaussian Mixture Model (GMM) Classification, Monitor Defect, and Extract Feature.

9. An explainable artificial intelligence (AI) modeling and simulation system, comprising:

a storage unit configured to store algorithms; and
a processor configured to, when an algorithm suitable for a workflow create and edited according to a subject area is selected from pre-stored algorithms, design an AI workflow model, and, when input information is inputted, perform a simulation for an AI workflow model with respect to the input information,
wherein the processor is further configured to:
when a plurality of deep learning AI workflow models or a plurality of machine learning AI workflow models are designed, register a simulation for each AI workflow model,
perform the registered respective simulations,
when the respective simulations are performed, compare and evaluate performance of the respective AI workflow models in real time, based on results of performing the respective simulations,
continuously distribute or change an optimal AI workflow model according to a result of comparing and evaluating in real time,
when image data is inputted, divide the image data into analysis unit areas, determine whether there is a defect in each area, and determining a grade according to a result of determining;
extract image features by measuring an area of interest which is determined as having a defect,
search similar images of the image features;
estimate a fault-causing factor by analyzing commonality of the similar images, and
generate explanation data including the fault-causing factor.

* * * * *